United States Patent [19]
Sharp et al.

[11] Patent Number: 5,795,933
[45] Date of Patent: Aug. 18, 1998

[54] WATERBORNE COATING COMPOSITIONS HAVING ULTRA LOW FORMALDEHYDE CONCENTRATION

[75] Inventors: Louis J. Sharp, Libertyville; Hilda R. Dimaano, Chicago, both of Ill.

[73] Assignee: The Dexter Corporation, Windsor Locks, Conn.

[21] Appl. No.: 769,124

[22] Filed: Dec. 19, 1996

[51] Int. Cl.⁶ ........................................... C08K 3/20
[52] U.S. Cl. ................................. 524/596; 524/598
[58] Field of Search ............................ 524/596, 598

[56] References Cited

U.S. PATENT DOCUMENTS 5,143,954  9/1992  Hutton et al. ...................... 524/106
5,160,503 11/1992  Smith .................................. 8/115.7

*Primary Examiner*—Edward J. Cain
*Attorney, Agent, or Firm*—Marshall, O'Toole, Gerstein, Murray & Borun

[57] ABSTRACT

A waterborne coating composition for metal substrates comprising (a) a formaldehyde-containing resin, and (b) a formaldehyde scavenger consisting essentially of an organic compound having at least one active methylene hydrogen and a pKa of about 5 to about 13, wherein the formaldehyde scavenger is present in a sufficient amount to maintain the concentration of free formaldehyde in the composition at less than 0.1% by weight.

21 Claims, No Drawings

WATERBORNE COATING COMPOSITIONS HAVING ULTRA LOW FORMALDEHYDE CONCENTRATION

FIELD OF THE INVENTION

The present invention relates to waterborne coating compositions for metal containers that, after extended storage, contain less than 0.1%, by weight, free formaldehyde. A waterborne coating composition comprises: (a) a formaldehyde-containing resin; (b) a formaldehyde scavenger, said scavenger consisting essentially of an organic compound having an active methylene hydrogen and a pKa about 5 to about 13, such as, for example, a formaldehyde scavenger having a general formula.

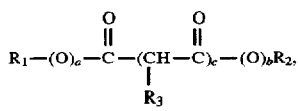

wherein $R_1$ is a hydrocarbon group containing one to five carbon atoms, $R_2$ is a hydrocarbon group containing two to five carbon atoms, $R_3$ is selected from the group consisting of hydrogen, a hydrocarbon group containing one to eight carbon atoms, phenyl, and halo, a and b, independently, are 0 or 1, and c is 1 or 2; and (c) an aqueous carrier, wherein the formaldehyde scavenger is present in a sufficient amount to maintain the concentration of free formaldehyde in the composition at 0.1% or less, by weight of the composition.

BACKGROUND OF THE INVENTION

It is well known that an aqueous solution in contact with an untreated metal substrate can result in corrosion of the untreated metal substrate. Therefore, a metal article, such as a metal container for a water-based product, like a food or beverage, is rendered corrosion resistant in order to retard or eliminate interactions between the water-based product and the metal article. Generally, corrosion resistance is imparted to the metal article, or to a metal substrate in general, by passivating the metal substrate, or by coating the metal substrate with a corrosion-inhibiting coating.

Investigators continually have sought improved coating compositions that reduce or eliminate corrosion of a metal article and that do not adversely affect an aqueous product packaged in the metal article. For example, investigators have provided compositions that yield impervious coatings which are flexible, adhesive to metal substrates, and resistant to chemical attack by products packaged and stored in a metal container manufactured from the metal substrate.

Conventionally, organic solvent-based coating compositions were used to provide cured coatings having excellent chemical resistance. Such solvent-based compositions include ingredients that are inherently water insoluble, and thereby effectively resist the solvating properties of water-based products packaged in the metal container. However, because of environmental and toxicological concerns, and in order to comply with increasingly strict governmental regulations, an increasing number of coating compositions are water based. The water-based coating compositions include ingredients that are water soluble or water dispersible, and, therefore, cured coatings resulting from water-based coating compositions often are more susceptible to the solvating properties of water.

An important ingredient in numerous water-based compositions is a formaldehyde-containing resin, such as a phenol-formaldehyde resin or a melamine-formaldehyde resin, for example. The formaldehyde-containing resins contain a plurality of reactive sites, and, accordingly, have the ability to crosslink and form an impervious coating. By using a combination of a formaldehyde-containing resin and a second resin, such as an acrylic resin or epoxy resin, the properties of the coating can be adjusted to provide a cured coating that is adhesive and flexible.

Formaldehyde-containing resins are condensation products of formaldehyde and a compound having active hydrogen atoms, such as a phenol, a urea, benzoguanamine, and melamine. The condensation product typically contains an excess of free formaldehyde, an irritating gas having known toxic and potentially carcinogenic properties. The free formaldehyde thereby poses an environmental danger and a health risk to workers in metal can manufacturing plants. In particular, the workers coat a metal substrate with the coating composition prior to forming the metal substrate into a metal can. During cure of the coating composition on the metal substrate, the free formaldehyde is expelled from the composition. If the free formaldehyde concentration of coating compositions is too high, the air in the workplace can become contaminated and excessive amounts of formaldehyde can be inhaled by the workers.

Government regulators are acting to reduce or eliminate the presence free formaldehyde from metal can manufacturing plants, and, thereby eliminate the environmental and health concerns associated with formaldehyde. Presently, government regulations require that the coating compositions contain 0.1% by weight or less formaldehyde. Investigators have been able to reduce the amount of free formaldehyde in freshly prepared coating compositions to meet this regulatory limit. However, coating compositions comprising a formaldehyde-containing resin demonstrate a gradual increase in free formaldehyde concentration during storage, such that the regulatory limit of 0.1% by weight can be exceeded during the expected life of the coating composition.

The present invention is directed to waterborne coating compositions that initially contain an ultra low concentration of formaldehyde, and which maintain a low concentration of formaldehyde for the expected life of the coating compositions. Accordingly, the present coating compositions meet the strict exposure limits designed to protect persons in the workplace from exposure to formaldehyde.

Various patents disclose compounds and methods of scavenging formaldehyde. Pacifici U.S. Pat. Nos. 5,194,674; 5,268,502; and 5,446,195, and Smith U.S. Pat. No. 5,160,503, disclose water-soluble compounds having an active methylene group that are useful formaldehyde scavengers for reducing the amount of formaldehyde released from durable press treated fabrics or the manufacture of particleboard. Smith U.S. Pat. No. 5,160,503 requires a polyhydric alcohol to be used in conjunction with the active methylene compound. Leung et al. U.S. Pat. No. 5,328,687 discloses formaldehyde scavengers which decrease the concentration of formaldehyde associated with the in vivo degradation of a biocompatible polymer.

Christenson et al. U.S. Pat. No. 4,560,717 discloses cationic electrodepositable compositions containing a formaldehyde scavenger. The formaldehyde scavenger is a nitrogen-containing compound and serves to stabilize composition pH. North U.S. Pat. No. 5,352,372 discloses the use of formaldehyde scavengers in compositions for treating textile fabrics. Mathews et al. U.S. Pat. No. 5,358,748 discloses an acidic composition containing a phenol formaldehyde resin and a formaldehyde scavenger. The formaldehyde scavenger is a nitrogen-containing compound, and the composition is a binder for glass fiber. Johnson et al. U.S. Pat. No. 5,429,726 also discloses amine-containing formaldehyde scavengers for use in polarographic analytical methods.

Useful waterborne coating compositions for the interior of food and beverage containers possess the advantageous properties of adhesion, flexibility, chemical resistance and corrosion inhibition, are economical and do not adversely affect the taste or other aesthetic properties of sensitive food and beverages packaged in the container. Investigators have sought a waterborne coating composition that demonstrates these advantageous properties and also reduces or eliminates the environmental and toxicological concerns associated with free formaldehyde. The present invention is directed to such waterborne coating compositions.

In particular, investigators prefer a thermosetting coating composition because such compositions provide better chemical resistance than thermoplastic coating compositions. A thermosetting coating composition however requires the presence of a crosslinking agent in order to provide a cured coating composition having a sufficient molecular weight. Generally, the crosslinking agent is a phenolic resin, an aminoplast, or a similar resin, each of which contains and can generate free formaldehyde. Therefore, investigators have sought a waterborne coating composition for food and beverage containers (1) that meets increasingly strict environmental regulations with respect to free formaldehyde concentration, and (2) has corrosion inhibition properties at least equal to existing coating compositions. Such a waterborne coating composition would satisfy a long felt need in the art.

SUMMARY OF THE INVENTION

A present waterborne coating composition comprises: (a) a formaldehyde-containing resin; (b) a formaldehyde scavenger consisting essentially of an organic compound having at least one active methylene hydrogen and a pKa about 5 to about 13; and (c) an aqueous carrier. A nonlimiting example of a class of formaldehyde scavengers has a general structural formula:

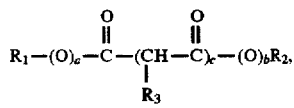

wherein $R_1$ is a hydrocarbon group containing one to five carbon atoms, $R_2$ is a hydrocarbon group containing two to five carbon atoms, $R_3$ is selected from the group consisting of hydrogen, a hydrocarbon group containing one to eight carbon atoms, hydrogen, phenyl, and halo, a and b, independently, are 0 or 1, and c is 1 or 2.

The formaldehyde scavenger is present in a sufficient amount to maintain the concentration of free formaldehyde in the composition at 0.1% or less, by weight, for the expected life of the composition. A present waterborne composition maintains the advantageous properties of the formaldehyde-containing resin and other resins present in the composition, such as adhesion, hardness, and flexibility of the cured coating compositions, but also maintains the concentration of free formaldehyde at 0.1% or less, and typically 0.05% or less, by weight of the composition, thereby substantially eliminating the environmental and toxicological concerns associated with free formaldehyde.

In particular, the present waterborne coating compositions comprise: (a) about 0.1% to about 100%, by weight of nonvolatile material, of a formaldehyde-containing resin, (b) a sufficient amount of a formaldehyde scavenger such that the concentration of free formaldehyde in the composition is 0.1% or less by weight (i.e., 0% to 0.1%, inclusive, by weight), wherein the formaldehyde scavenger has at least one active methylene hydrogen and a pKa of about 5 to about 13; and (c) an aqueous carrier. A present waterborne coating composition optionally can include other resins and compounds to impart desired properties to the coating composition and cured coating compositions resulting therefrom, such as a resin that imparts improved flexibility to the cured coating composition.

In accordance with another important aspect of the present invention, the formaldehyde scavenger is a liquid compound that is inert with respect to composition ingredients, yet is capable of scavenging free formaldehyde at room temperature. The formaldehyde scavenger also has a sufficient volatility such that the scavenger is expelled from the coating composition during a curing step, and, therefore, is not present to adversely affect a cured coating composition.

Another aspect of the present invention is to provide a waterborne coating composition containing a sufficient amount of formaldehyde scavenger such that the free formaldehyde concentration in the composition is maintained at 0.05% or less, and preferably 0.02% or less, by weight of the composition. As used herein, the term "free formaldehyde" is defined as the monomeric $CH_2O$ in the composition, and does not include formaldehyde present in condensed form in the formaldehyde-containing resin.

In accordance with another important aspect of the present invention, the waterborne coating compositions have a pH of about 7 to about 9.5, preferably about 7.2 to about 9, and to achieve the full advantage of the present invention, about 7.3 to about 8.5.

Components (a) through (c), and optional components, if present, are dispersed in an aqueous carrier such that a waterborne coating composition includes about 10% to about 60%, and preferably about 15% to about 50%, by weight of the total composition, of nonvolatile components. To achieve the full advantage of the present invention, a waterborne coating composition includes about 20% to about 50%, by weight of the total composition, of nonvolatile components. Other optional components, such as additional resins or polymers, a pigment, a filler, or an additive to enhance composition esthetics or performance, also can be included in the composition, and accordingly increase the weight percent of total nonvolatile material in the composition to above about 60% by weight of the total waterborne coating composition. A waterborne coating composition also can include organic solvents to assist in dispersing or emulsifying composition ingredients or to improve application of the waterborne coating composition to a substrate.

As used here and hereafter, the term "waterborne coating composition" is defined as a coating composition including a formaldehyde-containing resin, a formaldehyde scavenger, and any other optional ingredients dispersed in the aqueous carrier. The term "cured coating composition" is defined as an adherent polymeric coating resulting from curing a waterborne coating composition.

Therefore, one important aspect of the present invention is to provide a waterborne coating composition that effectively inhibits the corrosion of ferrous and nonferrous metal substrates and that overcomes the environmental and toxicological problems associated with free formaldehyde. A waterborne coating composition, after application to a metal substrate, and subsequent curing at a sufficient temperature for a sufficient time to effect cross-linking and expulsion of the carrier, provides an adherent layer of a cured coating composition that effectively inhibits corrosion, exhibits excellent flexibility and adhesion to the metal substrate, and does not adversely affect a product, like a food or beverage, that contacts the cured coating composition. A cured coating composition comprises the formaldehyde-containing resin, and other optional resins and nonvolatile components, essentially in the amounts these ingredients are present in the waterborne coating composition, expressed as nonvolatile material. The formaldehyde scavenger is essentially completely expelled from a waterborne coating composition during the cure step (i.e., 99.9% to 100% of the formaldehyde scavenger is expelled during cure), and, therefore, is not present to adversely affect the cured composition.

In accordance with another important aspect of the present invention, a waterborne coating composition provides a cured coating composition that overcomes the disadvantages of prior coatings containing a formaldehyde-containing resin used to coat the interior of containers for food and beverages. A present waterborne coating composition has an extremely low formaldehyde concentration, and, therefore, overcomes the health and environmental concerns associated with prior coating compositions containing a relatively higher free formaldehyde concentration.

These and other aspects and advantages of the present invention will become apparent from the following detailed description of the preferred embodiments.

DETAILED DESCRIPTION OF THE PREFERRED EMBODIMENTS

A waterborne coating composition of the present invention, after curing, provides a cured coating composition that effectively inhibits the corrosion of metal substrates. The waterborne coating compositions contain 0.1% or less, and typically less than 0.05%, by weight of free formaldehyde, even after long periods of storage. The present waterborne coating compositions thereby overcome the environmental and toxicological problems associated with free formaldehyde.

In general, a present waterborne coating composition comprises: (a) a formaldehyde-containing resin, (b) a formaldehyde scavenger consisting essentially of an organic compound having at least one active methylene hydrogen and a pKa of about 5 to about 13; and (c) an aqueous carrier, wherein the formaldehyde scavenger is present in a sufficient amount to maintain the concentration of free formaldehyde in the composition at 0.1% or less by weight. A present waterborne coating composition can include optional ingredients, such as polyester resins, acrylic resins, epoxy resins, phenoxy resins or epoxy-acrylic resins, or organic solvents, that improve the esthetics of the composition, that facilitate processing of the composition, or that improve a functional property of the composition. The individual composition ingredients are described in more detail below.

In accordance with an important feature of the present invention, the present waterborne coating compositions contain about 0.1% to about 100%, and preferably about 1% to about 80%, by weight of nonvolatile material, of a formaldehyde-containing resin. To achieve the full advantage of the present invention, the waterborne coating compositions contain about 2% to about 75%, by weight of nonvolatile material, of a formaldehyde-containing resin. The formaldehyde-containing resin can be the predominant film-forming resin in the composition, or can be present in a sufficient amount to act as a cross-linking agent.

The formaldehyde-containing resin can be any formaldehyde condensation product known in the art. For example, the formaldehyde-containing resin can be condensation product resulting from a reaction between a phenol and formaldehyde, i.e., a phenolic resin. Similarly, the formaldehyde-containing resin can be an aminoplast, like a urea-formaldehyde resin, a melamine-formaldehyde resin, or a benzoguanamine-formaldehyde resin. The formaldehyde-containing resin typically has a weight average molecular weight, $M_w$, of about 300 to about 15,000.

In particular, the formaldehyde-containing resin can be a phenolic resin which is a reaction product of a phenol and formaldehyde, and has reactive methylol groups. Nonlimiting examples of phenols which can be used to manufacture phenolic resins are phenol, orthocresol, metacresol, paracresol, 2,4-xylenol, para-tertiary-butylphenol, p-octylphenol, p-nonylphenol, p-phenylphenol, bisphenol A, resorcinol, and similar phenols. Particularly useful phenolic resins are polymethylol phenols wherein the phenolic hydroxyl group is etherified with an alkyl or unsaturated aliphatic group such as methyl or ethyl, or an allyl group. Phenolic resins and their method of preparation are described in detail in *Kirk-Othmer Encyclopedia of Chemical Technology*, 4th Ed., Volume 18, John Wiley and Sons, New York, N.Y., pages 603–644 (1996), incorporated herein by reference.

Nonlimiting examples of aminoplast resins are the reaction products of a compound containing an amino group, such as ureas (including substituted ureas) and triazines (like melamine, benzoguanamine, and acetoguanamine), with formaldehyde, which optionally can be etherified with an alcohol. Specific examples of aminoplast resins are the reaction products of urea, dihydroxyethyleneurea, ethyleneurea, propyleneurea, thiourea, melamine, benzoguanamine, acetoguanamine, or glycoluril with formaldehyde. The aminoplast resins can be used in the methylol form, but preferably are utilized at least in part in the ether form where the etherifying agent is a monohydric alcohol containing 1 to about 6 carbon atoms. Examples of suitable alcohols are methanol and butanol. Aminoplast resins and their method of preparation are described in detail in *Kirk-Othmer Encyclopedia of Chemical Technology*, 4th Ed., Volume 2, John Wiley and Sons, New York, N.Y., pages 604–637 (1992), incorporated herein by reference.

To protect workers from the adverse affects of free formaldehyde, government regulations require that the amount of free formaldehyde in a composition containing a formaldehyde-containing compound or resin be limited. Accordingly, manufacturers of formaldehyde-containing resins have taken appropriate measures to ensure that the concentration of free, or monomeric, formaldehyde in a composition is a maximum of 0.1% by weight of the composition.

However, during storage, formaldehyde-containing compounds and resins can slowly degrade. The slow degradation generates free formaldehyde such that the concentration of free formaldehyde can approach, or even exceed, the target maximum limit of 0.1% by weight during storage.

In order to maintain the concentration of free formaldehyde at, or below, 0.1% by weight, and preferably below 0.05% by weight, the present waterborne coating compositions contain a formaldehyde scavenger. The formaldehyde scavenger is present in a sufficient amount to maintain the free formaldehyde concentration at 0.1% or less, by weight, for the expected life of the composition, i.e., about six months. Preferably, the formaldehyde scavenger is present in a sufficient amount to maintain the free formaldehyde concentration at 0.05% or less, by weight, for the expected life of the composition. To achieve the full advantage of the present invention, the formaldehyde scavenger is present in a sufficient amount to maintain the free formaldehyde concentration at 0.02%, or less, by weight, for at least six months.

Alternatively stated, a present waterborne coating composition contains about 0.5% to about 5%, and preferably about 0.75% to about 4%, by weight of the composition, of a formaldehyde scavenger. To achieve the full advantage of the present invention, the present waterborne coating compositions contain about 1% to about 3%, by weight, of the formaldehyde scavenger.

A formaldehyde scavenger incorporated into the waterborne coating composition is a water-soluble liquid, has at least one active methylene hydrogen, and has a pKa of about 5 to about 13. A preferred formaldehyde scavenger has a pKa of about 5 to about 11, and, to achieve the full advantage of the present invention, a pKa of about 6 to about 9.

The formaldehyde scavenger has at least one active methylene hydrogen. The term "active methylene hydrogen" is defined herein as a hydrogen atom covalently bonded to a saturated carbon atom, wherein the saturated carbon atom is further covalently bonded to at least two electron-withdrawing moieties. The electron-withdrawing moieties sufficiently increase the acidity of the active methylene hydrogen to permit extraction of the methylene hydrogen from the compound at a pH of about 7 to about 9.5, and thereby provide an equilibrium concentration of a carbanion in the composition. The resulting carbanion is available to react with, and scavenge, free formaldehyde present in the waterborne coating composition. After a carbanion is consumed in the reaction with formaldehyde, another carbanion is formed to maintain the equilibrium concentration of carbanion. Accordingly, reactive carbanions are continuously generated and are available to scavenge for free formaldehyde generated during the gradual degradation of the formaldehyde-containing resin.

The electron-withdrawing moieties bonded to the saturated carbon atom of the active methylene hydrogen can be the same or different. Examples of electron-withdrawing moieties include, but are not limited to, carbonyl, cyano, nitro, sulfone, sulfoxide, halo, and trihalomethyl. The carbonyl moiety can be a keto, aldehyde, ester, or amide moiety. As used here and hereafter, the halo moiety can be fluoro, chloro, bromo, or iodo.

One example of a class of formaldehyde scavengers useful in the present waterborne coating compositions has a general structural formula:

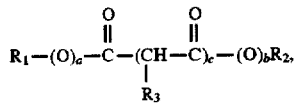

wherein $R_1$ is a hydrocarbon group containing one to five carbon atoms, $R_2$ is a hydrocarbon group containing two to five carbon atoms, $R_3$ is selected from the group consisting of hydrogen, a hydrocarbon group containing one to eight carbon atoms, phenyl, and halo, a and b, independently, are 0 or 1, and c is 1 or 2. As used here and throughout this specification, the hydrocarbon groups $R_1$, $R_2$, and $R_3$, independently, can be alkyl, alkenyl, or alkynyl. In addition, the hydrocarbon groups $R_1$, $R_2$, and $R_3$, independently, can be substituted with a halo moiety.

Nonlimiting examples of formaldehyde scavengers useful in the present waterborne coating composition, therefore, include dimethyl malonate, diethyl malonate, methyl acetoacetate, ethyl acetoacetate, isopropyl acetoacetate, t-butyl acetoacetate, methyl t-butyl malonate, and similar compounds.

Other nonlimiting examples of useful formaldehyde scavengers are 1,3-cyclohexanedione, and compounds having the general structural formula:

wherein $R_3$ is selected from the group consisting of hydrogen, a hydrocarbon group containing one to eight carbon atoms, phenyl, and halo; $R_4$ is selected from the group consisting of hydrogen, phenyl, hydrocarbyl, and alkoxy, wherein the hydrocarbyl and alkoxy groups contain one to eight carbon atoms, X is selected from the group consisting of nitro, cyano, sulfoxide ($-SOR_5$), sulfone ($-SO_2R_5$), halo, and trihalomethyl, wherein $R_5$ is a hydrocarbon group containing one to five carbon atoms, and c is 1 or 2. As used here and throughout this specification, the hydrocarbyl group $R_4$ can be alkyl, alkenyl, or alkynyl. Hydrocarbon group $R_5$ is defined above with respect to the $R_1$, $R_2$, and $R_3$ groups.

The formaldehyde scavenger is capable of reacting with free formaldehyde at room temperature, but otherwise is inert with respect to all other composition ingredients. The formaldehyde scavenger also is a liquid solvent-like compound having a sufficient volatility such that the formaldehyde scavenger is expelled from the coating composition during a curing step, such as heating a 0.4 to 0.6 mil thick film of the waterborne coating composition at about 350° F. (177° C.) to about 500° F. (260° C.) for about 1 to about 5 minutes. Because the formaldehyde scavenger is sufficiently volatile to be essentially completely expelled from the composition during cure (i.e., at least 99.9% of the formaldehyde scavenger evaporates), the formaldehyde scavenger is not present to adversely affect the properties of the cured coating composition.

An important feature of the present invention is expulsion of the formaldehyde scavenger from the waterborne coating composition such that the formaldehyde scavenger is not present in the cured coating composition. The formaldehyde scavenger, therefore, consists essentially of a liquid organic compound having at least one active methylene hydrogen, a pKa of about 5 to about 13, and preferably about 5 to about 11, and having sufficient volatility to be essentially completely absent from the cured coating composition.

Additional compounds, such as a polyhydric alcohol, are not essential to achieve sufficient formaldehyde scavenging, and can be detrimental to the cured coating composition. In particular, a polyhydric alcohol can have a vapor pressure that prevents essentially complete expulsion of the polyhydric alcohol from a waterborne coating composition during the cure cycle, and, therefore, remains in the cured coating composition to adversely affect the cured coating, e.g., softens the coating. Therefore, the formaldehyde scavenger used in the present waterborne coating compositions is free of a polyhydric alcohol component. Similarly, solid nitrogen-containing scavengers, such as a monomeric triazine, like melamine, are not useful as formaldehyde scavengers in the present waterborne coating compositions.

A present waterborne coating composition is an aqueous composition, but also typically includes volatile organic solvents. In general, the volatile organic solvents included in a waterborne coating composition have sufficient volatility to evaporate essentially entirely from the waterborne coating composition during the cure cycle, such as during heating at about 350° F. (177° C.) to about 500° F. (260° C.) for about 1 to about 5 minutes.

The volatile organic solvents are included as a portion of the carrier (i.e., about 5% to about 50% by weight of the carrier) to help dissolve, disperse, or emulsify composition ingredients, and thereby provide a more stable composition. The volatile organic solvents also are included to improve the physical properties of the composition, like surface tension, flow out during cure, and viscosity, and thereby provide a composition that is easier to apply and that provides a more uniform cured coating. The volatile organic solvents improve the flow properties of a waterborne coating composition and facilitate spraying of a waterborne coating composition.

Numerous volatile organic solvents can be included in a present waterborne coating composition. Suitable volatile organic solvents have a sufficiently low vapor pressure to resist evaporation during storage and a sufficiently high vapor pressure to be evaporated from the waterborne coating composition during cure. Exemplary, nonlimiting volatile organic solvents include, but are not limited to, the methyl, ethyl, propyl, butyl, hexyl or phenyl ether of ethylene glycol, diethylene glycol, triethylene glycol, propylene glycol or dipropylene glycol, ethylene glycol methyl ether acetate, ethylene glycol ethyl ether acetate, ethylene glycol butyl ether acetate, diethylene glycol ethyl ether acetate, diethylene glycol butyl ether acetate, propylene glycol methyl ether acetate, dipropylene glycol methyl ether acetate, n-butanol, hexyl alcohol, hexyl acetate, methyl n-amyl ketone, butylene glycol, propylene glycol, diisobutyl ketone, methyl propyl ketone, methyl ethyl ketone, methyl isobutyl ketone, 2-ethoxyethyl acetate, t-butyl alcohol, amyl alcohol, 2-ethylhexyl alcohol, cyclohexanol, isopropyl alcohol, and similar organic solvents, and mixtures thereof.

The carrier also can include a relatively low amount of a nonpolar organic solvent, such as up to about 10% by total weight of the carrier, without adversely affecting a waterborne coating composition, either prior to or after curing. Exemplary nonpolar organic solvents include a chlorinated hydrocarbon, an aliphatic hydrocarbon or an aromatic hydrocarbon, like toluene, benzene, xylene, mineral spirits, kerosene, naphtha, heptane, hexane, and similar hydrocarbons, and mixtures thereof.

A carrier is included in the composition in a sufficient amount to provide a waterborne coating composition including about 10% to about 60%, and preferably about 15% to about 50%, by weight of the composition, of nonvolatile components. To achieve the full advantage of the present invention, a waterborne coating composition includes about 20% to about 50% by weight of the composition, of nonvolatile components.

The amount of carrier included in a waterborne coating composition is limited only by the desired, or necessary, rheological properties of a waterborne coating composition. Usually, a sufficient amount of carrier is included in a waterborne coating composition to provide a composition that can be processed easily, that can be applied to a metal substrate easily and uniformly, and that is sufficiently evaporated from a waterborne coating composition during cure within the desired cure time.

Therefore, essentially any carrier comprising a major portion of water and a minor portion of volatile organic solvents is useful in the present waterborne coating composition as long as the carrier adequately disperses, emulsifies and/or solubilizes the composition components, is inert with respect to interacting with composition components and thereby adversely affecting the stability of the coating composition or the ability of the coating composition to effectively cure, and evaporates quickly, essentially entirely and relatively rapidly to provide a cured coating composition that inhibits the corrosion of a metal substrate, and that demonstrates sufficient physical properties, like adhesion and flexibility, for use as a coating on the interior or exterior of a container.

A waterborne coating composition of the present invention also can include other optional ingredients that do not adversely affect the waterborne coating composition or a cured coating composition resulting therefrom. Such optional ingredients are known in the art, and are included in a waterborne coating composition to enhance composition esthetics, to facilitate manufacturing, processing, handling and application of the composition, and to further improve a particular functional property of a waterborne coating composition or a cured coating composition resulting therefrom.

Such optional ingredients include, for example, dyes, pigments, extenders, fillers, anticorrosion agents, flow control agents, thixotropic agents, dispersing agents, antioxidants, adhesion promoters, light stabilizers, and mixtures thereof. Conventionally, a nonionic or an anionic surfactant is included in a waterborne coating composition to improve flow properties. Each optional ingredient is included in a sufficient amount to serve its intended purpose, but not in such an amount to adversely affect a waterborne coating composition or a cured coating composition resulting therefrom.

In particular, a present waterborne coating composition can contain about 0% to about 99.9%, by weight of nonvolatile material, of a resin or polymer in addition to the formaldehyde-containing resins in order to improve a property of the cured coating composition, such as adhesion, flexibility, mar resistance, or chemical resistance. For example, the additional resin can be a polyester, an epoxy/acrylate resin, an epoxy resin, a phenoxy resin, or an acrylic resin. An example of a coating compositions containing a formaldehyde-containing resin and additional resins can be found in Cole U.S. Pat. No. 5,043,380.

To demonstrate the usefulness of the present waterborne coating compositions, coating compositions containing various formaldehyde scavengers were prepared, and the concentration of free formaldehyde in the composition was monitored over time. In the first set of experiments, a waterborne coating composition containing an epoxy acrylate resin and a formaldehyde-containing resin was monitored for free formaldehyde concentration at pH 7.3 and at pH 8.17 over a 34-day period. The results are summarized in Table 1 as Experiments 1 and 2, respectively.

The formaldehyde-containing resin present in the coating composition was CYMEL 303 aminoplast resin, available from Cytec Industries, Inc., Stamford, Conn. The CYMEL 303 resin was present in an amount of 7.02% by weight of the composition. A sample of CYMEL 303 was analyzed and found to contain 0.22% by weight free formaldehyde. Table 1, Experiment 1, shows that at pH 7.3, the concentration of formaldehyde increases from an initial concentration of 0.025% by weight to 0.230% by weight after 34 days, or an increase of formaldehyde concentration by a factor of eight. At pH 8.17, Experiment 2 shows that the concentration of free formaldehyde increased from an initial concentration of 0.025% by weight to 0.100% by weight, or an increase by a factor of four. Similar results are observed in Experiments 5 and 6, wherein the compositions are free of a formaldehyde scavenger, and have a pH of 8.45 and 9.5, respectively, and demonstrate a greater than threefold increase in free formaldehyde concentration over a 34-day period.

formaldehyde scavenger is present in at least about a 3:1, and preferably at least about a 5:1, molar ratio of formaldehyde scavenger to initial free formaldehyde concentration in the composition (i.e., initial free formaldehyde concentration of the composition in the absence of a formaldehyde

TABLE 1

| Experiment | $1^1$ | $2^2$ | $3^1$ | $4^2$ | $5^4$ | $6^5$ |
|---|---|---|---|---|---|---|
| Initial[6] | .025%[3] | .025% | .012% | .012% | .025% | .023% |
| 4 days | .092 | .039 | .0085 | .012 | .037 | .042 |
| 7 days | .130 | .053 | .0080 | .013 | .050 | .058 |
| 14 days | .170 | .017 | .016 | .017 | .065 | .076 |
| 21 days | .250 | .110 | .032 | .015 | .100 | .110 |
| 34 days | .230 | .100 | .044 | .0006 | .080 | .083 |
| 47 days | | | | .001 | | |
| 55 days | | | | .0025 | | |
| 65 days | | | | .0068 | | |
| 72 days | | | | .0097 | | |
| 116 days | | | | .003 | | |

[1] Composition pH 7.3;
[2] Composition pH 8.17;
[3] Percent by weight;
[4] Composition pH 8.45;
[5] Composition pH 9.5; and
[6] Formaldehyde concentration determined by reverse phase HPLC.

Experiments 1 and 2 show that a composition containing a formaldehyde-containing resin, but free of a formaldehyde scavenger, initially can easily meet the target maximum directed to free formaldehyde concentration. However, over a relatively short time of 34 days, the compositions exceed (Experiment 1) or barely meet (Experiment 2) the target maximum of 0.1% by weight free formaldehyde.

In contrast, an identical composition containing a formaldehyde-containing resin was used in Experiments 3 and 4, except 1.4% by weight of a formaldehyde scavenger (i.e., ethyl acetoacetate) was added to the composition. Experiment 3 was conducted at pH 7.3 and Experiment 4 was conducted at pH 8.17.

The effect of the formaldehyde scavenger is apparent even for the initial measurement of formaldehyde concentration wherein the initial free formaldehyde concentration in Experiments 3 and 4 is one-half the initial free formaldehyde concentration of Experiments 1 and 2. Furthermore, in Experiment 3, the free formaldehyde concentration after 34 days is 0.044% by weight, which is well below the 0.1% target maximum. In contrast, Experiment 1, which lacks a formaldehyde scavenger, has a free formaldehyde concentration of 0.230% after 34 days, or 2.3 times greater than the target maximum.

Experiment 4 shows the effect of adjusting the pH of the composition to the preferred range of about 7.3 to about 8.5. In Experiment 4, the free formaldehyde concentration is 0.003% after 116 days, which is 25% less than the free formaldehyde concentration of Example 3 after 34 days. Accordingly, the free formaldehyde concentration of Example 4 would not exceed the target maximum of 0.1% by weight over the expected lifetime of the product, i.e., about six months.

The amount of ethyl acetoacetate incorporated into the compositions used in Experiments 3 and 4 was 1.4% by weight, which is a 10 molar excess over the initial free formaldehyde concentration in the composition. Although the present formaldehyde scavengers react with formaldehyde on a 1:1 molar basis, in order to insure that a sufficient amount of formaldehyde scavenger is present to maintain the free formaldehyde concentration below the 0.1% target maximum for the expected lifetime of the product, the scavenger). To achieve the full advantage of the present invention, the molar ratio of formaldehyde scavenger to initial free formaldehyde concentration is at least about 10:1. However, the weight percent of formaldehyde scavenger typically does not exceed about 5% by weight of the composition because 5% by weight is a sufficient excess of formaldehyde scavenger to perform in accordance with the present invention, and any excess formaldehyde scavenger would be wasted.

In accordance with another important feature of the present invention, the incorporation of a formaldehyde scavenger into a composition containing a formaldehyde-containing resin does not adversely affect the cured coating composition. In particular, the compositions of Experiments 2 and 4 were applied as individual 0.4 to 0.6 mil thick coatings, i.e., 1–2 milligrams (mg) of cured coating composition per square inch ($in^2$) of metal substrate, to the exterior of a drawn-walled-ironed (DWI) steel can substrate. The individual coatings then were cured at about 400° F. (204° C.) for about 5 minutes or about 415° F. (213° C.) for about 3 minutes. As set forth in Table 2, the cured coating compositions of Experiment 2 (no formaldehyde scavenger present) and Experiment 4 (formaldehyde scavenger present) were essentially identical. The addition of 1.4% by weight ethyl acetoacetate, therefore, caused a slight reduction in coating composition viscosity prior to cure, but no additional effects on the coating composition, or the cured coating composition resulting therefrom, were observed.

TABLE 2

| | Experiment 2 | Experiment 4 |
|---|---|---|
| Viscosity | 134 sec. | 126 sec. (batch sl. yellow) |
| Coefficient of Friction | .04/.05 | .04/.05 (no film yellowing detected) |
| 1% boiling JOY[7] (10 min.) | adhesion- -very good, no blush | adhesion- -very good, no blush |

TABLE 2-continued

|  | Experiment 2 | Experiment 4 |
|---|---|---|
| DI process[8] (60 min./250° F.) | adhesion- -very good, no blush | adhesion- -very good, no blush |

[7]the cured coating composition was tested for adhesion and blush after immersion for 10 minutes in a boiling 1% solution of JOY dishwashing composition; and
[8]the cured coating composition was tested for adhesion and blush after immersion for 60 minutes in a steam autoclave at 250° F. and a pressure of about 15 psig.

The ability of other compounds to scavenge formaldehyde from compositions containing a formaldehyde-containing resin also was tested. In particular, various compounds, in an amount of 1.4% by weight of the composition, were added to a commercially available composition containing a formaldehyde-containing resin, i.e., AQUADEX® WASH-COAT CONCENTRATE, available from The Dexter Corporation, Waukegan, Ill. All the compounds were tested at pH 8.17. The results are summarized in Table 3.

TABLE 3

| Hydrogen Peroxide | Initial .0290 | 7 days .086 | 14 days .128 | 28 days .120 | | |
|---|---|---|---|---|---|---|
| Dimethyl malonate | initial .0011 | 10 days .0049 | 18 days .0018 | 33 days .036 | 61 days .047 | |
| Diethyl malonate | initial .007 | 10 days .0012 | 18 days .0027 | 33 days .016 | 61 days .034 | 103 days .054 |
| t-butyl acetoacetate | initial .00047 | 10 days .00018 | 18 days .0001 | 33 days .0001 | 61 days .005 | 103 days .025 |
| CLAR-REZ 825[9] | initial .00027 | 9 days .0022 | | 37 days .003 | | 103 days .065 |

[9]CLAR-REZ 825 is a polyphenolic additive available from Clarence Resins and Chemicals, Inc., Williamsville, NY.

The data in Table 3 illustrates that formaldehyde scavengers consisting essentially of an organic compound having an active methylene hydrogen and a pKa of about 5 to about 13, effectively scavenge formaldehyde from compositions containing a formaldehyde-containing resin. Hydrogen peroxide was ineffective with respect to maintaining the free formaldehyde concentration below the regulatory limit of 0.1% by weight over extended storage periods. The CLAR-REZ product effectively scavenged for formaldehyde, but is not sufficiently volatile to be expelled from the composition during the cure process, and, therefore, can adversely affect the properties of a cured coating composition.

In another experiment, a coating composition containing an epoxy-acrylic resin and a formaldehyde-containing resin was modified by adding about 0.5% by weight of ethyl acetoacetate to the composition. The modified composition (Composition A) was compared to an identical composition that was free of ethyl acetoacetate (Composition B). Compositions A and B were periodically analyzed for free formaldehyde by reverse phase liquid chromatography. The results are summarized in Table 4. Table 4 illustrates

TABLE 4

| Composition A | Composition B |
|---|---|
| .015 (6 days) | 0.11 (2 days) |
| .020 (34 days) | 0.18 (18 days) |
| .039 (75 days) | | that the formaldehyde-containing resin generates free formaldehyde over time (Composition B), whereas ethyl acetoacetate effectively removes free formaldehyde from the composition over long storage periods.

Compositions A and B also were compared to each other, and to a commercial coating (BASF 10 W 26), for an ability to provide a cured coating composition having the necessary properties for use on a food or beverage container. The results are summarized in Table 5. For each composition, a sample was applied as a 0.4–0.6 mil thick coating (1–2 mg/in$^2$) on a metal substrate, and the coated metal substrate was heated at 400° F. (204° C.) for 5 minutes or 415° F. (213° C.) for 3 minutes to cure the coating composition. The cured coating composition then was tested. Each coating was applied on similar DWI steel can substrates (i.e., Substrate A and Substrate B), and all experiments were run in triplicate. The test results are reported in Table 6 on a scale of one (best) to five (worst).

TABLE 5

|  | Composition A | | Composition B | | Commercial Composition | |
|---|---|---|---|---|---|---|
| % Nonvolatile Material | 31.1% (by weight) | | 29.0% | | 33.27% | |
| Viscosity | 12.0 sec | | 14.0 sec | | N/A | |
|  | Substrate A[10] | Substrate B[10] | Substrate A | Substrate B | Substrate A | Substrate B |
| Film appearance | sl. hazy | high gloss | sl. hazy | high gloss | smooth | high gloss |
| Coeff. of Friction | .045/.045, .045/.045 | .045/.04, .045/.041 | .045/.04, .045/.045 | .045/.04 | .045/.045, .045/.05 | .045/.05, .05/.05 |
| Blush (pH 6) | 1, 1, 1 | 1, 1, 1 | 1, 1, 1 | 1, 1, 1 | 1, 1, 1 | 1, 1, 1 |
| Water spot (pH 6) | 3, 3, 2 | 1, 1, 2 | 2, 3, 3 | 1, 1, 1 | 3, 3, 3 | 1, 2, 3 |
| Adhesion (pH 6) | 3, 1, 1 | 1, 1, 1 | 1, 2, 3 | 1, 1, 1 | 1, 1, 3 | 1, 1, 2 |
| Blush (pH 9) | 1, 1, 1 | 1, 1, 1 | 1, 1, 1 | 1, 1, 1 | 1, 1, 1 | 1, 1, 1 |
| Water spot (pH 9) | 1, 2, 3 | 1, 1, 1 | 1, 3, 3 | 1, 1, 1 | 2, 2, 3 | 1, 2, 2 |
| Adhesion (pH 9) | 1, 1, 2 | 1, 1, 1 | 1, 1, 2 | 1, 1, 1 | 1, 2, 2 | 1–, 1–, 2 |
| MEK double rubs | 200+ | | 200+ | | 75 | |
| Scuff resistance | parallel to grain 1, 1 | perpendicular to grain 1, 1 | parallel to grain, 1, 1 | perpendicular to grain 1, 1 | parallel to grain, 5, 5 | perpendicular to grain 5, 5 |

[10]DWI steel can substrates.

Table 5 shows that incorporating a formaldehyde scavenger into the composition does not adversely affect the properties of the cured coating composition, yet maintains the concentration of free formaldehyde below the 0.1% maximum concentration limit.

In particular, the MEK rub test measures resistance of a cured coating to chemical attack. In the MEK rub test, cheesecloth saturated with methyl ethyl detone (MEK) is rubbed back and forth against a coated flattened DWI can using hand pressure. A rub back and forth is designated as one "double rub." In this test, the cured coating is rubbed until the MEK dissolves or otherwise disrupts the cured coating. Typically, a cured coating passes the MEK rub test if the coating is unaffected by fifty double rubs with the MEK saturated cloth.

In another experiment, a coating composition containing an acrylic resin and a phenolic resin was prepared (Composition C). Composition C did not contain a formaldehyde scavenger. The phenolic resin incorporated into Composition C was a phenol-formaldehyde resin having a weight average molecular weight of about 530 and about 70% by weight nonvolatile matter. The phenolic resin was analyzed and found to contain 0.30% by weight free formaldehyde. Composition C had a viscosity of 21 seconds, 34.5% nonvolatile material, pH 7.6, and a 0.342% by weight initial free formaldehyde concentration.

Composition D also was prepared. Composition D was identical to Composition C, except for the addition of 1.4% by weight of ethyl acetoacetate as a formaldehyde scavenger. The physical properties of Composition D were essentially identical to the physical properties of Composition C.

The concentration of free formaldehyde was monitored over a three-month period. The results are summarized in Table 6.

TABLE 6

|  | Initial | 7 days | 37 days | 3 months |
|---|---|---|---|---|
| Composition C | 0.1% | 0.11% | 0.115% | 0.10% |
| Composition D | Not detectable[12] | Not detectable | Not detectable | Not detectable |

[12]Not detectable means less than or equal to 0.0025% free formaldehyde by weight.

Table 6 shows that Composition C had a free formaldehyde concentration that exceeded the target maximum limit of 0.1% by weight free formaldehyde. In contrast, Composition D contained an undetectable amount of 0.0025% or less by weight free formaldehyde over at least a 3-month storage period. Accordingly, the concentration of free formaldehyde in Composition D would not exceed the regulatory limit of 0.1% by weight during the expected life of the composition, i.e., about six months.

The properties demonstrated by a waterborne coating composition of the present invention, and a cured coating composition resulting therefrom, show that the formaldehyde scavenger imparts no adverse effects and maintains the free formaldehyde concentration below the target maximum limit for the expected lifetime of the composition.

Obviously, many modifications and variations of the invention as hereinbefore set forth can be made without departing from the spirit and scope thereof, and, therefore, only such limitations should be imposed as are indicated by the appended claims.

What is claimed is:

1. A waterborne coating composition for application to a metal substrate comprising:
   (a) about 0.1% to 100%, by weight of nonvolatile material, of a formaldehyde-containing resin, wherein the formaldehyde-containing resin is selected from the group consisting of a phenolic resin, an aminoplast and mixtures thereof;
   (b) a formaldehyde scavenger, said scavenger consisting essentially of an organic compound having at least one active methylene hydrogen and a pKa of about 5 to about 13, and present in a sufficient amount to maintain a concentration of free formaldehyde in the composition at 0.1% or less, by weight, for at least six months; and
   (c) an aqueous carrier in an amount sufficient such that the waterborne coating composition contains about 10% to about 60% by weight nonvolatile material, wherein the composition has a pH of about 7 to about 9.5.

2. The composition of claim 1 further comprising a second resin in an amount of 0% to about 99.9%, by weight of nonvolatile material.

3. The composition of claim 1 wherein the composition contains about 1% to about 80%, by weight of nonvolatile material, of the formaldehyde-containing resin.

4. The composition of claim 1 wherein the phenolic resin is a reaction product of formaldehyde and a phenol selected from the group consisting of phenol, orthocresol, metacresol, paracresol, 2,4-xylenol, para-tertiary-butylphenol, p-octylphenol, p-nonylphenol, p-phenylphenol, bisphenol A, resorcinol, and mixtures thereof.

5. The composition of claim 1 wherein the aminoplast is a reaction product of formaldehyde and an amino-group containing compound selected from the group consisting of a urea, a triazine, and a mixture thereof.

6. The composition of claim 5 wherein the amino group containing compound is selected from the group consisting of urea, dihydroxyethyleneurea, ethyleneurea, propyleneurea, thiourea, melamine, benzoguanamine, acetoguanamine, and glycoluril.

7. The composition of claim 1 wherein the formaldehyde-containing resin has a weight average molecular weight of about 300 to about 15,000.

8. The composition of claim 1 wherein the concentration of free formaldehyde is maintained at less than 0.05% by weight of the composition.

9. The composition of claim 1 wherein the concentration of free formaldehyde is maintained at less than 0.02% by weight of the composition.

10. The composition of claim 1 containing about 0.5% to about 5%, by weight of the composition, of the formaldehyde scavenger.

11. The composition of claim 1 wherein the formaldehyde scavenger has a pKa of about 5 to about 11.

12. The composition of claim 1 wherein the formaldehyde scavenger has a structural formula:

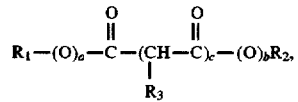

wherein $R_1$ is a hydrocarbon group containing one to five carbon atoms, $R_2$ is a hydrocarbon group containing two to five carbon atoms, $R_3$ is selected from the group consisting of hydrogen, a hydrocarbon group containing one to eight carbon atoms, phenyl, and halo, a and b, independently, are 0 or 1, and c is 1 or 2.

13. The composition of claim 1 wherein the formaldehyde scavenger is selected from the group consisting of 1,3-cyclohexanedione, dimethyl malonate, diethyl malonate, methyl acetoacetate, ethyl acetoacetate, isopropyl acetoacetate, t-butyl acetoacetate, methyl t-butyl malonate, and mixtures thereof.

14. The composition of claim 1 wherein the carrier contains about 5% to about 50%, by weight of the carrier, of a volatile organic solvent.

15. The composition of claim 1 having a pH of about 7.2 to about 9.

16. The composition of claim 1 wherein the formaldehyde scavenger is present in about a 3 to 1 to about a 10 to 1 molar ratio of formaldehyde scavenger to initial free formaldehyde concentration.

17. The composition of claim 1 wherein the formaldehyde scavenger is a liquid compound having sufficient volatility to essentially completely evaporate from a 0.4 to 0.6 mil thick film of the composition in about 1 to about 5 minutes at about 177° C. to about 260° C.

18. The composition of claim 2 wherein the second resin is selected from the group consisting of a polyester, an epoxy resin, a phenoxy resin, an acrylic resin, an epoxy-acrylic resin, and mixtures thereof.

19. A method of maintaining a free formaldehyde concentration in a coating composition containing a formaldehyde-containing resin at less than 0.1% by weight of the composition for at least six months, said method comprising the step of adding about 0.5% to about 5%, by weight of the composition, of a formaldehyde scavenger to the composition, said formaldehyde scavenger consisting essentially of an organic compound having at least one active methylene hydrogen and a pKa of about 5 to about 13, and wherein the formaldehyde-containing resin is selected from the group consisting of a phenolic resin, an aminoplast, and mixtures thereof.

20. A waterborne coating composition for application to a metal substrate comprising:

(a) about 0.1% to 100%, by weight of nonvolatile material, of a formaldehyde-containing resin, wherein the formaldehyde-containing resin is selected from the group consisting of a phenolic resin, an aminoplast, and mixtures thereof;

(b) a formaldehyde scavenger, said scavenger consisting essentially of an organic compound having at least one active methylene hydrogen and a pKa of about 5 to about 13, and present in a sufficient amount to maintain a concentration of free formaldehyde in the composition at 0.1% or less, by weight, for at least six months; and (c) an aqueous carrier in an amount sufficient such that the waterborne coating composition contains about 10% to about 60% by weight nonvolatile material, wherein the composition has a pH of about 7 to about 9.5 and is free of a polyhydric alcohol.

21. A waterborne coating composition for application to a metal substrate comprising:

(a) about 0.1% to 100%, by weight of nonvolatile material, of a formaldehyde-containing resin, wherein the formaldehyde-containing a resin is selected from the group consisting of a phenolic resin, an aminoplast, and mixtures thereof;

(b) a formaldehyde scavenger, said scavenger comprising an organic compound having a structural formula:

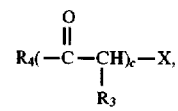

wherein $R_3$ is selected from the group consisting of hydrogen, a hydrocarbon group containing one to eight carbon atoms, phenyl, and halo; $R_4$ is selected from the group consisting of hydrogen, phenyl, hydrocarbyl, and alkoxy, wherein the hydrocarbyl and alkoxy groups contain one to eight carbon atoms, X is selected from the group consisting of nitro, cyano, $-SOR_5$, $-SO_2R_5$, halo, and trihalomethyl, wherein $R_5$ is a hydrocarbon group containing one to five carbon atoms, and c is 1 or 2, and a pKa of about 5 to about 13, and present in a sufficient amount to maintain a concentration of free formaldehyde in the composition at 0.1% or less, by weight, for at least six months; and (c) an aqueous carrier in an amount sufficient such that the waterborne coating composition contains about 10%, to about 60% by weight nonvolatile material, wherein the composition has a pH of about 7 to about 9.5.

* * * * *

UNITED STATES PATENT AND TRADEMARK OFFICE
CERTIFICATE OF CORRECTION

PATENT NO. : 5,795,933

DATED : August 18, 1998

INVENTOR(S) : Louis J. Sharp et al.

It is certified that error appears in the above-identified patent and that said Letters Patent is hereby corrected as shown below:

Column 18, line 7, delete "a"

Signed and Sealed this

Seventeenth Day of August, 1999

Attest:

Q. TODD DICKINSON

*Attesting Officer*  *Acting Commissioner of Patents and Trademarks*